United States Patent
Hidaka

(10) Patent No.: US 12,044,989 B2
(45) Date of Patent: Jul. 23, 2024

(54) IMAGE FORMING APPARATUS

(71) Applicant: CANON KABUSHIKI KAISHA, Tokyo (JP)

(72) Inventor: Keita Hidaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 17/736,611

(22) Filed: May 4, 2022

(65) Prior Publication Data

US 2022/0365465 A1 Nov. 17, 2022

(30) Foreign Application Priority Data

May 14, 2021 (JP) ................................. 2021-082282

(51) Int. Cl.
*G03G 15/16* (2006.01)
*G03G 15/00* (2006.01)
*H04N 1/00* (2006.01)

(52) U.S. Cl.
CPC ..... *G03G 15/1675* (2013.01); *G03G 15/5062* (2013.01); *G03G 15/607* (2013.01); *H04N 1/00045* (2013.01); *H04N 1/00087* (2013.01); *H04N 2201/0094* (2013.01)

(58) Field of Classification Search
CPC ........... G03G 15/1675; G03G 15/5062; H04N 1/00045
See application file for complete search history.

(56) References Cited

U.S. PATENT DOCUMENTS

| | | | |
|---|---|---|---|
| 2009/0284775 A1* | 11/2009 | Muramatsu | H04N 1/6033 358/1.9 |
| 2017/0097593 A1* | 4/2017 | Itagaki | G03G 15/1675 |
| 2017/0195500 A1* | 7/2017 | Sugimoto | H04N 1/00023 |
| 2018/0341208 A1* | 11/2018 | Nakamura | G03G 15/6517 |
| 2018/0359380 A1* | 12/2018 | Itagaki | G03G 15/0848 |
| 2019/0107797 A1* | 4/2019 | Murayama | G03G 15/5062 |
| 2022/0060589 A1* | 2/2022 | Kobayashi | H04N 1/00082 |
| 2022/0197192 A1* | 6/2022 | Kobayashi | G03G 15/5041 |

FOREIGN PATENT DOCUMENTS

JP 2021-009346 A 1/2021

* cited by examiner

*Primary Examiner* — Carla J Therrien
(74) *Attorney, Agent, or Firm* — Canon U.S.A., Inc. IP Division

(57) ABSTRACT

An image forming apparatus includes an image forming portion, a transfer unit, a power supply, and a reader. A test chart is formed by transferring test images to a recording material while applying test voltages from the power supply to the transfer unit. A transfer voltage to be applied to the transfer unit during transfer is set based on the read test images. A reference image is formed on the test chart. The reader reads the test chart by scanning the test chart from a first position to a second position that falls within the test images. The first position falls within a boundary of the recording material on which the test chart is formed and falls outside the test images. Based on the reference image, the result of the reader reading the test chart is obtained by scanning the test chart from the first position to the second position.

12 Claims, 11 Drawing Sheets

IMAGE FORMING APPARATUS

BACKGROUND

Field

The present disclosure relates to an image forming apparatus that forms a toner image on a recording material.

Description of the Related Art

In recent years, digital copiers have become the mainstream of copying machines. The digital copiers read a document to generate image data using a document reader, apply digital processing on the generated image data, transfer the processed image data to a printer unit, and print the transferred image data. An image forming apparatus using an electrophotographic method transfers a toner image formed on an image bearing member, such as a photosensitive member or an intermediate transfer member, to a recording material. The transfer of the toner image from the image bearing member to the recording material is often performed by applying a transfer voltage to a transfer member, such as a transfer roller, which makes contact with the image bearing member to form a transfer portion. Thus, provision of an adjustment mode where the setting value of the transfer voltage is adjusted depending on the recording material to be actually used for image formation has been discussed.

Japanese Patent Application Laid-Open No. 2021-9346 discusses an image forming apparatus having an adjustment mode for adjusting the setting value of a secondary transfer voltage. In the adjustment mode, a chart obtained by forming a plurality of patches (test images) on one sheet of recording material is output while the secondary transfer voltage is changed for each of the patches. The densities of the patches are then detected, and an optimum secondary transfer voltage condition is selected based on the detection results.

The test images sometimes include halftone images in order to check the states of halftone outputs under different secondary transfer voltage conditions. In this case, to ensure that the patches formed as the halftone images can be detected, an edge detection threshold for the patch pattern is set to be less severe. If the edge detection threshold is less severe and a color sheet is used for the adjustment, the edges of the sheet may be erroneously detected as the edges of adjustment patches. This raises an issue of difficulty in appropriately determining the positions of the patches.

SUMMARY

The present disclosure is directed to preventing erroneous detection of a test image for adjusting a secondary transfer voltage.

According to an aspect of the present disclosure, an image forming apparatus includes an image forming portion configured to form a toner image, a transfer unit configured to transfer the formed toner image to a recording material, a power supply configured to apply a voltage to the transfer unit, a reader configured to read an image on the recording material, and a control unit configured to execute a mode, wherein, in executing the mode, the control unit performs an output operation to output a test chart formed by transferring a plurality of test images to the recording material while applying a plurality of test voltages from the power supply to the transfer unit and then sets, based on a result of the reader reading the plurality of test images, a transfer voltage to be applied to the transfer unit during transfer, wherein, in outputting the test chart, the control unit controls the image forming portion to form a reference image on the test chart, wherein the result of the reader reading the plurality of test images is based on the reader reading the test chart by scanning the test chart from a first position to a second position, wherein the first position falls within a boundary of the recording material on which the test chart is formed and falls outside the plurality of test images, and the second position falls within the plurality of test images, and wherein the control unit is configured to obtain, based on the reference image, the result of the reader reading the test chart by scanning the test chart from the first position to the second position.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. The following exemplary embodiments are not intended to limit the present disclosure set forth in the claims, and all combinations of the features described in the exemplary embodiments are not necessarily indispensable to the disclosure.

Figure 1:
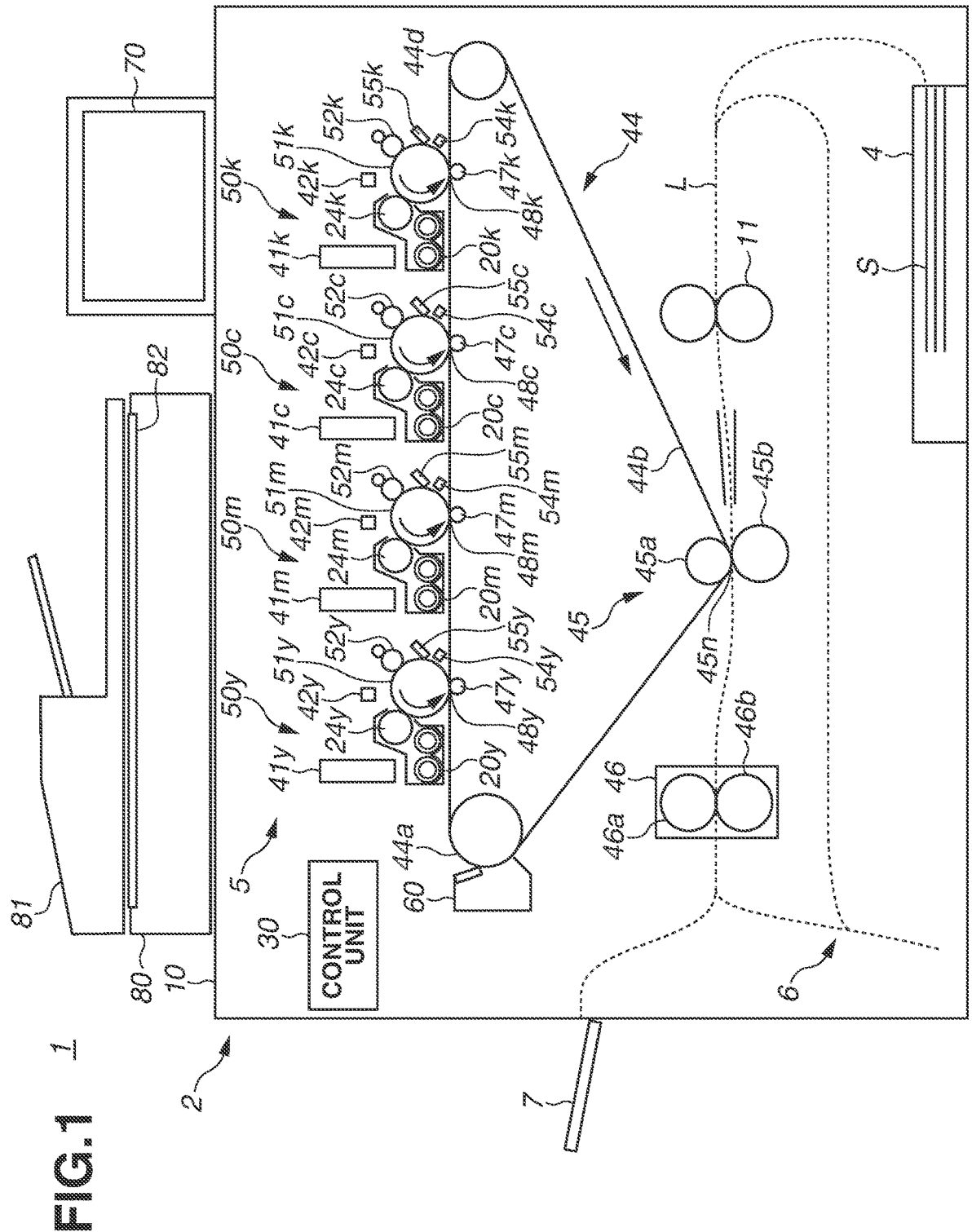
FIG. 1 is a diagram illustrating an outline of an image forming apparatus according to a first exemplary embodiment.

FIG. 1 is a schematic sectional diagram of an entire apparatus 1 according to a first exemplary embodiment of the present disclosure. An image forming apparatus 2 is a tandem type full-color printer employing an intermediate transfer method, and is capable of forming full-color images using an electrophotographic process. The image forming apparatus 2 is not limited to a tandem type image forming apparatus and may be other types of image forming apparatuses. In addition, the image forming apparatus 2 is not limited to those capable of forming full-color images, and may be those capable of forming monochrome images (black-and-white images or monochrome color images). Furthermore, the image forming apparatus 2 may be those used for various applications. Examples thereof include a printer, various printing machines, a copying machine, a facsimile (FAX), and a multifunction peripheral.

As illustrated in FIG. 1, the image forming apparatus 2 includes a sheet feed unit 4, an image forming portion 5, a control unit 30, and an operation unit 70. While FIG. 1 illustrates the single sheet feed unit 4, the image forming apparatus 2 may include a plurality of the sheet feed units 4. The image forming apparatus 2 also includes a temperature sensor 71 (see FIG. 2) capable of detecting an internal temperature of the image forming apparatus 2, and a humidity sensor 72 (see FIG. 2) capable of detecting an internal humidity of the image forming apparatus 2. The image forming apparatus 2 is capable of forming a full-color image of four colors on a recording material (a sheet or a transfer material) S based on image information (an image signal) from an image reading unit 80 (see FIG. 3) or an external apparatus 200 (see FIG. 2). The image reading unit 80 serves as a reading unit for reading an image on a sheet. Examples of the external apparatus 200 include a host apparatus, such as a personal computer, a digital camera, and a smartphone. The recording material S is used to form a toner image thereon. Specific examples thereof include a sheet of plain paper, a synthetic resin sheet that is a substitute for plain paper, a sheet of thick paper, and an overhead projector sheet.

The image forming portion 5 is capable of forming an image on the recording material S that is fed from the sheet feed unit 4 and moves in a conveyance path L, based on the image information. The image forming portion 5 includes image forming units 50y, 50m, 50c, and 50k (also collectively referred to as image forming units 50), toner bottles 41y, 41m, 41c, and 41k, exposure devices 42y, 42m, 42c, and 42K, an intermediate transfer unit 44, a secondary transfer device 45, and a fixing unit 46. The image forming units 50y, 50m, 50c, and 50K are configured to form yellow (y), magenta (m), cyan (c), and black (k) images, respectively. Components provided corresponding to the four image forming units 50y, 50m, 50c, and 50k and having similar or corresponding functions or configurations will be sometimes collectively described by omitting "y", "m", "c", and "k" at the ends of the reference numerals, which indicate the corresponding colors. The image forming apparatus 2 is also capable of forming a monochrome image, such as a monochrome black image, by using one of the image forming units 50 for a desired color, or forming a multicolor image by using some of the image forming units 50 for desired colors among the four colors.

Each of the image forming units 50 includes a photosensitive drum 51 and a charging roller 52. The photosensitive drum 51 is a drum (cylinder) shaped photosensitive member (electrophotographic photosensitive member) serving as a first image bearing member. The charging roller 52 is a roller-shaped charging member serving as a charging unit. Each of the image forming units 50 further includes a developing device 20 serving as a developing unit, a pre-exposure device 54 serving as a destaticizing unit, and a cleaning blade 55 that is a cleaning member serving as a photosensitive member cleaning unit.

The image forming units 50 form toner images on an intermediate transfer belt 44b (described below). The image forming units 50 are integrated units as process cartridges, and detachably attached to an image forming apparatus main body 10.

The photosensitive drum 51 is movable (rotatable) with an electrostatic image (an electrostatic latent image) or a toner image borne thereon. In the present exemplary embodiment, the photosensitive drum 51 is a negatively chargeable organic photoconductor (OPC) having an outer diameter of 30 mm. The photosensitive drum 51 includes an aluminum cylinder serving as a base, and a surface layer formed on the surface of the base. In the present exemplary embodiment, the surface layer includes three layers, namely, an undercoat layer, a photocarrier generation layer, and a charge transport layer that are applied to and stacked on the base in this order. When an image forming operation is started, the photosensitive drum 51 is driven to rotate in a direction (a counterclockwise direction) indicated by an arrow in FIG. 1 at a predetermined process speed (circumferential speed) by a motor (not illustrated) serving as a driving unit.

The surface of the rotating photosensitive drum 51 is uniformly charged by the charging roller 52. In the present exemplary embodiment, the charging roller 52 is a rubber roller that makes contact with the surface of the photosensitive drum 51 and is driven to rotate by the rotation of the photosensitive drum 51. A charging bias power supply 73 (see FIG. 2) is connected to the charging roller 52. The charging bias power supply 73 applies a charging bias (a charging voltage) to the charging roller 52 during a charging process.

The charged surface of the photosensitive drum 51 is scanned and exposed by the exposure device 42 based on the image information, whereby an electrostatic image is formed on the photosensitive drum 51. In the present exemplary embodiment, the exposure device 42 is a laser scanner. The exposure device 42 emits laser light based on image information about the corresponding color component output from the control unit 30, and scans and exposes the surface (the outer peripheral surface) of the photosensitive drum 51.

The electrostatic image formed on the photosensitive drum 51 is developed (visualized) by supply of developer toner from the developing device 20, whereby a toner image is formed on the photosensitive drum 51. In the present exemplary embodiment, the developing device 20 accommodates a two-component developer (hereinafter also simply referred to as a "developer") containing nonmagnetic toner particles (toner) and magnetic carrier particles (carrier). Toner is supplied to the developing device 20 from the toner bottle 41. The developing device 20 includes a developing sleeve 24. The developing sleeve 24 is made of a nonmagnetic material such as aluminum or nonmagnetic stainless (aluminum in the present exemplary embodiment). A magnet roller that is a roller-shaped magnet is fixed inside the developing sleeve 24 so as not to rotate with respect to a main body (a developing container) of the developing device 20. The developing sleeve 24 bears the developer and conveys the developer to a developing area opposed to the photosensitive drum 51. A developing bias power supply 74 (see FIG. 2) is connected to the developing sleeve 24. The developing bias power supply 74 applies a developing bias (a developing voltage) to the developing sleeve 24 during a developing process. In the present exemplary embodiment, the charging polarity of the toner during the development, i.e., the regular charging polarity of the toner is negative.

The intermediate transfer unit 44 is opposed to the four photosensitive drums 51y, 51m, 51c, and 51k. The intermediate transfer unit 44 includes the intermediate transfer belt 44b made of an endless belt serving as a second image bearing member. The intermediate transfer belt 44b is wound about a plurality of rollers including a driving roller 44a, a driven roller 44d, primary transfer rollers 47y, 47m, 47c, and 47k, and a secondary transfer inner roller 45a. The intermediate transfer belt 44b is movable (rotatable) with the toner image borne thereon. The driving roller 44a is driven to rotate by a motor (not illustrated) serving as a driving unit, and rotates (circumferentially moves) the intermediate transfer belt 44b. The driven roller 44d is a tension roller that controls the tension of the intermediate transfer belt 44b to a constant level. A biasing force from a spring (not illustrated) serving as a biasing unit is applied to the driven roller 44d so that the intermediate transfer belt 44b is pushed to the outer peripheral surface side. The biasing force causes a tension of approximately 2 to 5 kg in a forward process direction of the intermediate transfer belt 44b. The secondary transfer inner roller 45a forms a part of the secondary transfer device 45 as will be described below. A driving force is transmitted from the driving roller 44a to the intermediate transfer belt 44b, whereby the intermediate transfer belt 44b is driven to rotate in a direction (a clockwise direction) indicated by an arrow in FIG. 1 at a predetermined circumferential speed corresponding to that of the photosensitive drum 51. The intermediate transfer unit 44 further includes a belt cleaning device 60 serving as an intermediate transfer member cleaning unit.

The primary transfer rollers 47y, 47m, 47c, and 47K that are roller-shaped primary transfer members serving as primary transfer units are opposed to the photosensitive drums 51y, 51m, 51c, and 51k, respectively. The primary transfer rollers 47 and the photosensitive drums 51 sandwich the intermediate transfer belt 44b therebetween. The intermediate transfer belt 44b is thereby brought into contact with the photosensitive drums 51 and forms primary transfer portions (primary transfer nip portions) 48 with the photosensitive drums 51.

The toner images formed on the photosensitive drums 51 are primarily transferred onto the intermediate transfer belt 44b at the primary transfer portions 48 by the action of the primary transfer rollers 47. More specifically, in the present exemplary embodiment, a primary transfer voltage of positive polarity is applied to the primary transfer rollers 47, whereby the toner images of negative polarity on the photosensitive drums 51 are primarily transferred onto the intermediate transfer belt 44b. For example, in the case of forming a full-color image, yellow, magenta, cyan, and black color toner images formed on the respective photosensitive drums 51y, 51m, 51c, and 51k are overlappingly transferred to the intermediate transfer belt 44b in such a manner that the toner images are sequentially superimposed on the intermediate transfer belt 44b. Primary transfer power supplies 75 (see FIG. 2) are connected to the primary transfer rollers 47. The primary transfer power supplies 75 apply a direct-current voltage of opposite polarity (positive polarity in the present exemplary embodiment) to the regular charging polarity of the toner to the primary transfer rollers 47 as a primary transfer bias (a primary transfer voltage) during a primary transfer process. Voltage detection sensors 75a for detecting an output voltage and current detection sensors 75b for detecting an output current are connected to the primary transfer power supplies 75 (see FIG. 2). In the present exemplary embodiment, the primary transfer power supplies 75y, 75m, 75c, and 75k are provided for the primary transfer rollers 47y, 47m, 47c, and 47k, respectively, and are capable of separately controlling the primary transfer voltages to be applied to the primary transfer rollers 47y, 47m, 47c, and 47k.

In the present exemplary embodiment, each of the primary transfer rollers 47 includes an elastic layer of ion conductive foamed rubber (nitrile butadiene rubber (NBR)) and a core. Each of the primary transfer rollers 47 has an outer diameter of 15 to 20 mm, for example.

Rollers having an electrical resistance of $1 \times 10^5$ to $1 \times 10^8 \Omega$ (measured at a normal temperature of 23° C. and a normal relative humidity (RH) of 50% with 2 kV applied) can be suitably used as the primary transfer rollers 47.

In the present exemplary embodiment, the intermediate transfer belt 44b is an endless belt having a double-layer structure including a base layer and a surface layer in order from the inner peripheral side. The base layer can be suitably formed of a resin such as polyimide or polycarbonate, or various types of rubber materials containing an appropriate amount of carbon black as an antistatic agent. The base layer has a thickness of 0.05 to 0.15 mm, for example.

The surface layer can be suitably formed of a resin such as fluorocarbon resin. The surface layer reduces adhesion of toner to the surface of the intermediate transfer belt 44b so that the toner can be easily transferred to the recording material S at a secondary transfer portion 45n. The surface layer has a thickness of 0.0002 to 0.020 mm, for example. In the present exemplary embodiment, one type of resin material among polyurethane, polyester, and epoxy resins, or two or more types of elastic materials such as elastic rubber, elastomer, and butyl rubber are used as a base material of the surface layer. The surface layer is then formed by dispersing a material that reduces the surface energy of the base material and increases the lubricity thereof. Examples of the material include one or more types of fluorocarbon resin powders or particles, and such powders or particles of different particle sizes. In the present exemplary embodiment, the intermediate transfer belt 44b has a volume resistivity of $5 \times 10^8$ to $1 \times 10^{14}$ $\Omega \cdot$cm (at 23° C. and 50% RH) and a coefficient of static friction of 0.15 to 0.6 (measured at 23° C. and 50% RH, using TYPE: 94i manufactured by HEIDON (Shinto Scientific Co., Ltd)). While in the present exemplary embodiment, the intermediate transfer belt 44b has the double-layer structure, the intermediate transfer belt 44b may have a single-layer structure of a material equivalent to that of the foregoing base layer.

A secondary transfer outer roller 45b is disposed on the outer peripheral side of the intermediate transfer belt 44b. The secondary transfer outer roller 45b forms the secondary transfer device 45 with the secondary transfer inner roller 45a. The secondary transfer outer roller 45b makes contact with the intermediate transfer belt 44b to form the secondary transfer portion (the secondary transfer nip portion) 45n between the secondary transfer outer roller 45b and the intermediate transfer belt 44b. The secondary transfer outer roller 45b makes contact with the secondary transfer inner roller 45a via the intermediate transfer belt 44b. The toner image formed on the intermediate transfer belt 44b is secondarily transferred onto the recording material S at the secondary transfer portion 45n by the action of the secondary transfer device 45. In the present exemplary embodiment, a secondary transfer voltage of positive polarity is applied to the secondary transfer outer roller 45b, whereby the toner image of negative polarity on the intermediate transfer belt 44b is secondarily transferred onto the recording material S that is conveyed while being sandwiched between the intermediate transfer belt 44b and the secondary transfer outer roller 45b. The recording material S is fed from the sheet feed unit 4 in parallel with the foregoing toner image forming operation, and conveyed to the secondary transfer portion 45n by a registration roller 11 in the conveyance path L in synchronization with the toner image on the intermediate transfer belt 44b.

As described above, the secondary transfer device 45 includes the secondary transfer inner roller 45a serving as a counter member and the secondary transfer outer roller 45b that is a roller-shaped secondary transfer member serving as a secondary transfer unit. The secondary transfer inner roller 45a and the secondary transfer outer roller 45b are opposed to each other with the intermediate transfer belt 44b therebetween. A secondary transfer power supply 76 (see FIG. 2) serving as an application unit is connected to the secondary transfer outer roller 45b. During a secondary transfer process, the secondary transfer power supply 76 applies a direct-current voltage of opposite polarity (positive polarity in the present exemplary embodiment) to the regular charging polarity of the toner to the secondary transfer outer roller 45b as a secondary transfer bias (a secondary transfer voltage). A voltage detection sensor 76a for detecting an output voltage and a current detection sensor 76b for detecting an output current are connected to the secondary transfer power supply 76 (see FIG. 2). The core of the secondary transfer inner roller 45a is connected to a ground potential. When the recording material S is fed to the secondary transfer portion 45n, a constant voltage-controlled secondary transfer voltage of opposite polarity to the regular charging polarity of the toner is applied to the secondary transfer outer roller 45b. For example, in the present exemplary embodiment, a secondary transfer voltage of 1 to 6.5 kV is applied to pass a current of 15 to 100 µA through the secondary transfer outer roller 45b, whereby the toner image on the intermediate transfer belt 44b is secondarily transferred onto the recording material S. In the present exemplary embodiment, the secondary transfer inner roller 45a is connected to the ground potential, and the voltage is applied from the secondary transfer power supply 76 to the secondary transfer outer roller 45b. By contrast, a voltage may be applied from the secondary transfer power supply 76 to the secondary transfer inner roller 45a serving as the secondary transfer member, and the secondary transfer outer roller 45b serving as the counter member may be connected to the ground potential. In this case, a direct-current voltage of the same polarity as the regular charging polarity of the toner is applied to the secondary transfer inner roller 45a.

In the present exemplary embodiment, the secondary transfer outer roller 45b includes the elastic layer of ion conductive foamed rubber (NBR rubber) and the core. The secondary transfer outer roller 45b has an outer diameter of 20 to 25 mm, for example. A roller having an electrical resistance of $1\times10^5$ to $1\times10^8 \Omega$ (measured at a normal temperature of 23° C. and a normal RH of 50% with 2 kV applied) can be suitably used as the secondary transfer outer roller 45b.

The recording material S to which the toner image is transferred is conveyed to the fixing unit 46 serving as a fixing device. The fixing unit 46 includes a fixing roller 46a and a pressure roller 46b. The fixing roller 46a includes a built-in heater serving as a heating unit. The recording material S with the unfixed toner image borne thereon is conveyed while being sandwiched between the fixing roller 46a and the pressure roller 46b, and is thereby heated and pressurized. This process fixes (melts and adheres) the toner image to the recording material S. The temperature (the fixing temperature) of the fixing roller 46a is detected by a fixing temperature sensor 77 (see FIG. 2).

In the case of forming an image on one side of the recording material S, the recording material S is directly discharged to a sheet discharge unit 7.

In the case of forming images on both sides of the recording material S, the recording material S is conveyed to a reversing conveyance path 6. The recording material S having the toner image fixed to the first side is reversed in the reversing conveyance path 6, and is fed to the secondary transfer portion 45n again. A toner image is transferred to the second side of the recording material S conveyed to the secondary transfer portion 45n again by the action of the reversing conveyance path 6. After the fixing of the toner image, the recording material S is discharged to the sheet discharge unit 7. In this manner, the image forming apparatus 2 according to the present exemplary embodiment is capable of performing automatic two-sided printing for forming images on both sides of the recording material S.

After the primary transfer process, the surface of the photosensitive drum 51 is destaticized by the pre-exposure device 54. Toner (Primary transfer residual toner) remaining on the photosensitive drum 51 without being transferred to the intermediate transfer belt 44b during the primary transfer process is removed from the surface of the photosensitive drum 51 by the cleaning blade 55 and is collected into a collection container (not illustrated). The cleaning blade 55 is a plate-like member pressed against the photosensitive drum 51 with a predetermined pressing force. The cleaning blade 55 makes contact with the surface of the photosensitive drum 51 in a counter direction where the tip of the free end of the cleaning blade 55 is directed to the upstream side in the rotation direction of the photosensitive drum 51. Toner (Secondary transfer residual toner) remaining on the intermediate transfer belt 44b without being transferred to the recording material S during the secondary transfer process, and substances adhering to the intermediate transfer belt 44b such as paper dust are removed and collected from the surface of the intermediate transfer belt 44b by the belt cleaning device 60.

An automatic document feeder (ADF)(or a conveyance unit) 81 and the image reading unit 80 are disposed on the top side of the image forming apparatus main body 10. The image reading unit 80 optically reads an image on a document placed on a platen glass (or a platen) 82 or a document conveyed to the platen glass 82 by the automatic document feeder 81, and converts the read image into an electrical signal.

Figure 2:
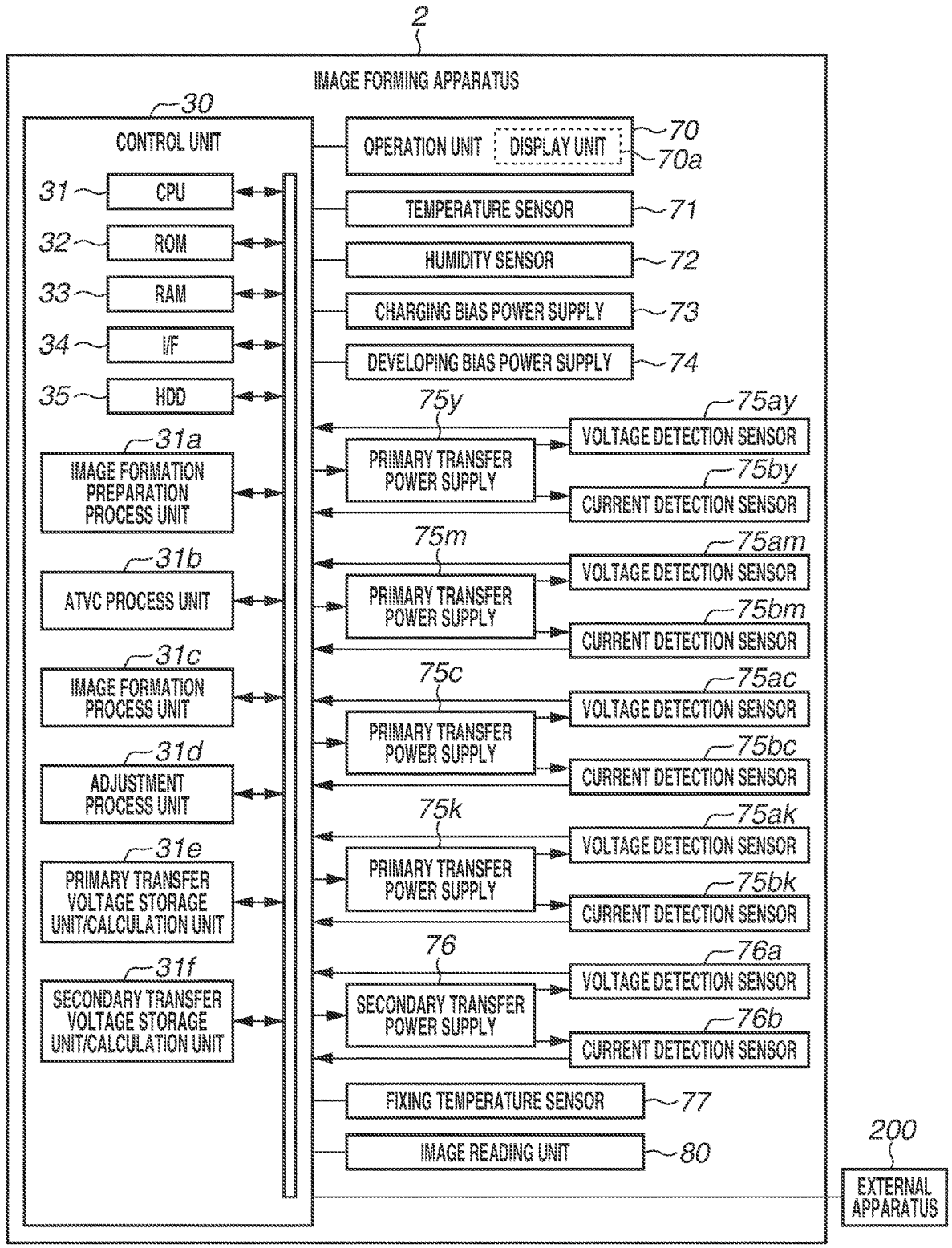
FIG. 2 is a block diagram illustrating a schematic configuration of a control system of the image forming apparatus according to the first exemplary embodiment.

FIG. 2 is a block diagram illustrating a schematic configuration of a control system of the image forming apparatus 2 according to the present exemplary embodiment. As illustrated in FIG. 2, the control unit 30 includes a computer. For example, the control unit 30 includes a central processing unit (CPU) 31, a read-only memory (ROM) 32 storing programs for controlling the components of the image forming apparatus 2, a random access memory (RAM) 33 for temporarily storing data, an input/output circuit (an interface (I/F)) 34 for inputting and outputting signals from/to an external source, and a hard disk drive (HDD) 35 storing data. The CPU 31 is a microprocessor in charge of overall control of the image forming apparatus 2. The CPU 31 is a system controller main unit and operates based on programs stored in the ROM 32. The CPU 31 is connected to the sheet feed unit 4, the image forming portion 5, and the operation unit 70 via the input/output circuit 34, exchanges signals with these components, and controls operations of the components. The ROM 32 is a boot ROM and stores a system boot program. The charging bias power supply 73, the developing bias power supply 74, the primary transfer power supplies 75, and the secondary transfer power supply 76 are connected to the control unit 30. Each of the power supplies is controlled by a signal from the control unit 30.

The temperature sensor 71, the humidity sensor 72, the voltage detection sensors 75a and the current detection sensors 75b for the primary transfer power supplies 75, the voltage detection sensor 76a and the current detection sensor 76b for the secondary transfer power supply 76, and the fixing temperature sensor 77 are also connected to the control unit 30. Respective signals detected by these sensors are input to the control unit 30. The HDD 35 stores system software, image data, and programs for controlling the operation of the image forming apparatus 2. The programs stored in the HDD 35 are loaded into the RAM 33, and the CPU 31 controls the operation of the image forming apparatus 2 based on the loaded programs.

The operation unit 70 includes operation buttons serving as input units, and a display unit 70a including a liquid crystal panel serving as a display device. In the present exemplary embodiment, the display unit 70a is configured as a touch panel and also functions as an input unit. An operator such as a user or a serviceperson can operate the operation unit 70 to execute a job (a series of operations to form an image or images on the one or plurality of recording materials S and output the recording material(s) S based on one start instruction). The control unit 30 receives signals from the operation unit 70, and operates various devices of the image forming apparatus 2.

The image forming apparatus 2 can also execute a job based on an image formation signal (image data or a control command) from the external apparatus 200 such as a personal computer.

In the present exemplary embodiment, the control unit 30 includes an image formation preparation process unit 31a, an automatic transfer voltage control (ATVC) process unit 31b, an image formation process unit 31c, and an adjustment process unit 31d. The control unit 30 also includes a primary transfer voltage storage unit/calculation unit 31e and a secondary transfer voltage storage unit/calculation unit 31f. These process units and storage units/calculation units may be provided as part of the CPU 31 and the RAM 33. For example, the control unit 30 (more specifically, the image formation process unit 31c) can execute a job as described above. The control unit 30 (more specifically, the adjustment processing unit 31d) can perform an adjustment mode for adjusting the setting value of the secondary transfer voltage during a non-image formation period. The adjustment mode will be described in detail below. The image forming apparatus 2 executes a "job" that is a series of image output operations to form an image or images on the one or plurality of recording materials S and output the recording material(s) S, started according to the start instruction from the control unit 30. Typically, the job includes an image formation process (a printing process), a preliminary rotation process, an inter-sheet process in the case of forming images on the plurality of recording materials S, and a subsequent rotation process. The image formation process is a period where electrostatic latent images of the image to be actually formed on the recording material S and output are formed, toner images are formed, the toner images are transferred, and the toner images are fixed to the recording material S. An image formation period refers to this period. The preliminary rotation process is a period after the input of the start instruction and before the start of the actual image formation, during which preparatory operations before the image formation process are performed. The inter-sheet process is a period corresponding to the interval between the recording materials S during continuous image formation for continuously forming images on the plurality of recording materials S.

The subsequent rotation process is a period during which organizing operations (preparatory operations) following the image formation process are performed. The non-image formation period refers to any period other than the image formation period. More specifically, the non-image formation period includes the above-described preliminary rotation process, inter-sheet process, and subsequent rotation process, and further includes a preliminary multiple rotation process that is a preparatory operation upon power-on of the image forming apparatus 2 or upon recovery from a sleep state.

Figure 3:
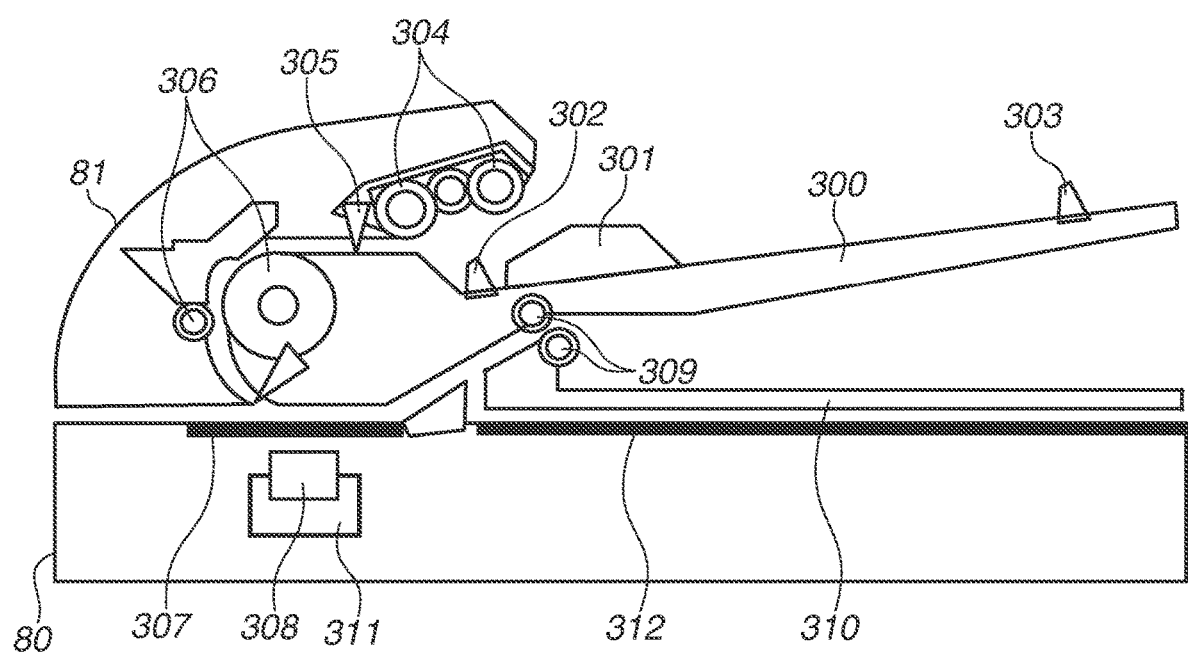
FIG. 3 is a diagram illustrating a schematic configuration of an image reader according to the first exemplary embodiment.

FIG. 3 is a sectional side diagram of an internal structure of a scanner (a reader or an image reader) including the image reading unit 80 and the automatic document feeder 81. The automatic document feeder 81 includes a document tray 300 for stacking sheets of a document to be read. A document sensor 302 for detecting the presence or absence of a document, two document guides 301, and a document size detection sensor 303 are disposed on the document tray 300. The two document guides 301 are arranged in a direction perpendicular to a document conveyance direction. The sheets of the document stacked on the document tray 300 are conveyed by three types of rollers, including pickup rollers 304, conveyance rollers 306, and discharge rollers 309. The pickup rollers 304 convey the sheets of the document stacked on the document tray 300 into a document conveyance path inside the automatic document feeder 81. The conveyance rollers 306 convey the document conveyed into the document conveyance path by the pickup rollers 304. The discharge rollers 309 convey the document conveyed by the conveyance rollers 306 to a discharge tray 310. The document conveyed by the pickup roller 304 is detected by a document passage detection sensor 305, and whether the first sheet of the document has passed is determined based on the detection time. The conveyance rollers 306, the pickup rollers 304, and the discharge rollers 309 are all driven by a stepping motor (not illustrated). The automatic document feeder 81 implements sub scan thinning processing by setting the driving pulses of the conveyance rollers 306, the pickup rollers 304, and the discharge rollers 309 to multiple frequencies. The conveyed document is read through a reading window 307 by a contact image sensor (CIS) 308 included in a sensor unit 311 below the reading window 307. The sensor unit 311 is freely movable in a sub scanning direction, and is movable in the same direction as the conveyance direction of the document being conveyed from the conveyance rollers 306 toward the discharge rollers 309. The reading window 307 has a certain amount of length in the sub scanning direction, and the CIS 308 is configured to be moved to any position within the range of the length and to read the document at the moved position. The CIS 308 includes photoelectric conversion elements such as charge-coupled devices (CCDs). The CIS 308 performs first-in first-out (FIFO) to accumulate images read by the photoelectric conversion elements, and at the same time generates control signals for controlling the FIFO and the photoelectric conversion elements. Typically, the CIS 308 is implemented by arranging a plurality of photoelectric conversion elements in a row. Although not illustrated in FIG. 3, the sensor unit 311 includes a light source for illuminating the document through the reading window 307 or a platen reading window 312. Typically, the light source is implemented by arranging a plurality of light sources in a row. For example, a light-emitting diode (LED) is used as the light source, but other types of light sources may also be used. The foregoing platen glass 82 refers to a combination of the reading window 307 and the platen reading window 312.

In a case where the user places a document on the platen glass 82 instead of the document tray 300, the sensor unit 311 is moved to a position under the platen reading window 312. The document is read through the platen reading window 312 by the CIS 308 while the sensor unit 311 is moved in the sub scanning direction. The read image data is stored in the RAM 33 or an image memory (not illustrated) dedicated to storing image data.

Figure 4:
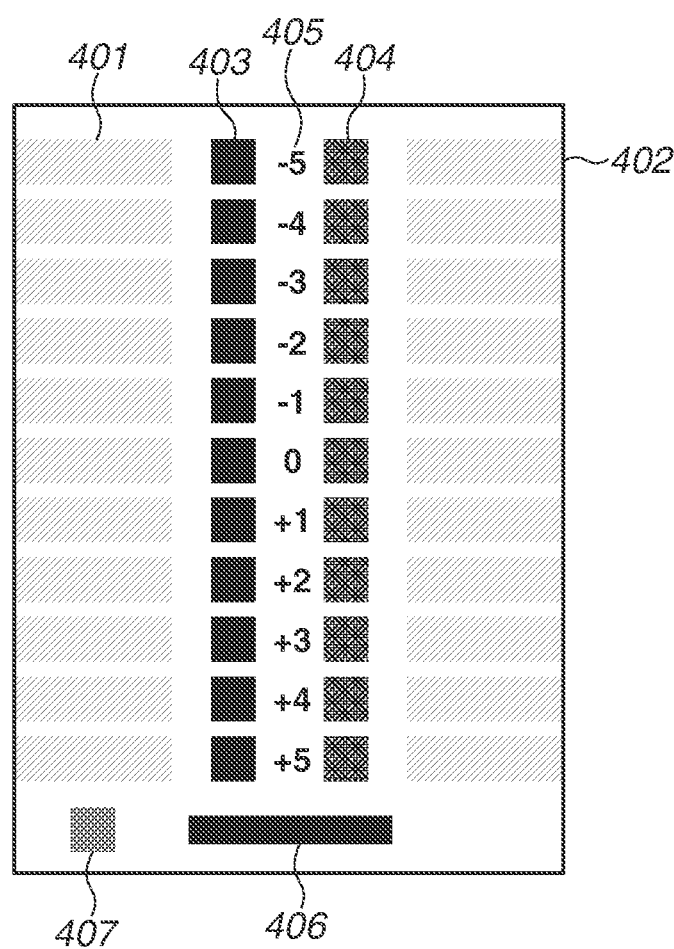
FIG. 4 is a diagram illustrating an example of image data of a test chart that is output in an adjustment mode according to the first exemplary embodiment.

FIG. 4 illustrates an example of a pattern image 400 that is used to output a test chart for adjusting the secondary transfer voltage according to the present exemplary embodiment.

The pattern image 400 is stored in the HDD 35. The image forming apparatus 2 is configured to output the test chart for adjusting the secondary transfer voltage by loading the stored pattern image 400 into the RAM 33 and forming an image on the recording material S based on the pattern image 400. Alternatively, the image forming apparatus 2 may be configured so that the CPU 31 generates the pattern image 400 on the RAM 33 and outputs the test chart. Patches or bars vertically arranged in FIG. 4 are of the same density and the same dither type. The pattern image 400 includes bar patterns 401 and 402 as test images for adjusting the secondary transfer voltage. The pattern image 400 also includes patch patterns 403 and 404 as test images for adjusting the secondary transfer voltage. The pattern image 400 further includes secondary transfer voltage value indications 405, a reference position determination black bar 406 serving as a reference image, and a page identification patch 407 serving as a page identification image. The bar patterns 401 and 402 are black halftone images.

The patch pattern 403 includes solid black images, and the patch pattern 404 includes solid blue images (solid images formed by superimposing solid images of two colors). The secondary transfer voltage value indications 405 indicate secondary transfer voltage values applied when the corresponding patches are formed. The user refers to the secondary transfer voltage value indications 405 during visual adjustment. The reference position determination black bar 406 is a solid black image. In other words, the reference position determination black bar 406 is formed as an image of higher density than those of the bar patterns 401 and 402. The page identification patch 407 is a solid image of one of the C, M, Y, and K colors. If the test chart is output on a plurality of pages in two-sided printing and the adjustment is made using the image reading unit 80, the page identification patch 407 is analyzed to determine which side is read. The page identification patch 407 may have a mixed color instead of one of the C, M, Y, and K colors. Although not illustrated in FIG. 4, the pattern image 400 may include a pattern indicating a page number associated with the color of the page identification patch 407.

When the pattern image 400 is formed on the recording material S, the secondary transfer voltage to be applied for the vertical bar patterns 401 and 402 and patch patterns 403 and 404 in FIG. 4 is changed in the vertical direction. The optimum voltage value for printing can thus be determined based on the output test chart by visually observing the test chart or reading the test chart using the image reading unit 80. For simplified control, the secondary transfer voltage to be applied in forming the reference position determination black bar 406 and the page identification patch 407 is set to the same secondary transfer voltage as that applied in forming the bottommost bars in the bar patterns 401 and 402 and the bottommost patches in the patch patterns 403 and 404 in FIG. 4. The image forming apparatus 2 may be configured to form the reference position determination black bar 406 and the page identification patch 407 by applying a secondary transfer voltage of a specific value determined based on the type of recording material S on which the pattern image 400 is to be formed.

The user can visually observe the pattern image 400 formed on the recording material S, determine the optimum secondary transfer voltage value by referring to the secondary transfer voltage value indications 405, the patch patterns 403 and 404, and the bar patterns 401 and 402, and set the determined value by using the operation unit 70. Alternatively, the optimum secondary transfer voltage value may be determined by using the image reading unit 80 to read the pattern image 400 formed on the recording material S and then using the CPU 31 to analyze the read image stored in the RAM 33 (which is the foregoing adjustment mode). Details of the adjustment using the image reading unit 80 will be described below. The optimum secondary transfer voltage value is determined based on luminance values in at least one type of pattern among the bar patterns 401 and 402 and the patch patterns 403 and 404. The adjustment value for the secondary transfer voltage can be set differently for each of the front and back of a sheet. The secondary transfer voltage can be adjusted for each of the front and back of one sheet by forming the pattern image 400 on each side of the recording material S.

The same pattern image 400 is used for both adjusting the secondary transfer voltage visually and adjusting the secondary transfer voltage using the image reading unit 80. In visually adjusting the secondary transfer voltage, the printed states of the solid patches in the patch patterns 403 and 404 are referred to on a priority basis. The pattern image 400 is intended for a case where the pattern image 400 is formed on the recording material S of specific size or more in both width and length, such as A3 paper. The smaller the sheet width is, a smaller number of patterns can be formed on the sheet. The patch patterns 403 and 404 of higher priority are thus arranged near the horizontal center of the pattern image 400, whereas the bar patterns 401 and 402 are arranged on sides of the pattern image 400. If a sheet having a narrow width is used, the bar patterns 401 and 402 having reduced widths are printed on the sheet. If a sheet having a width equivalent to that of A5R paper is used, the bar patterns 401 and 402 are not to be formed on the sheet. The adjustment using the image reading unit 80 is intended for sheets of specific size or more so that the bar patterns 401 and 402 are formed on the recording material S.

Figure 5A:
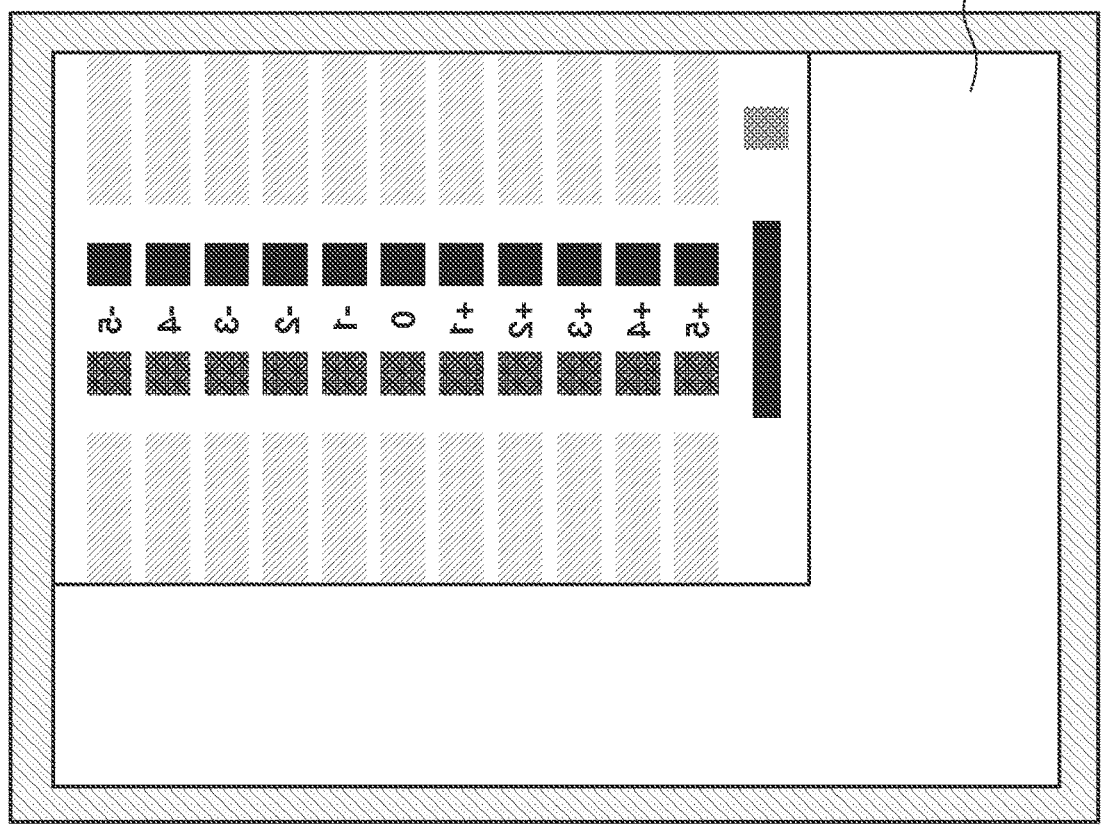
FIG. 5A is a diagram illustrating an example of how the test chart is placed on a platen in the adjustment mode.

FIG. 5A is a top view of the test chart that is obtained by forming the pattern image 400 on the recording material S and is placed on the platen reading window 312 with the print side down. In FIG. 5A, the test chart is aligned to the top left abutting position, which is the most appropriate way of placing the test chart.

Figure 5B:
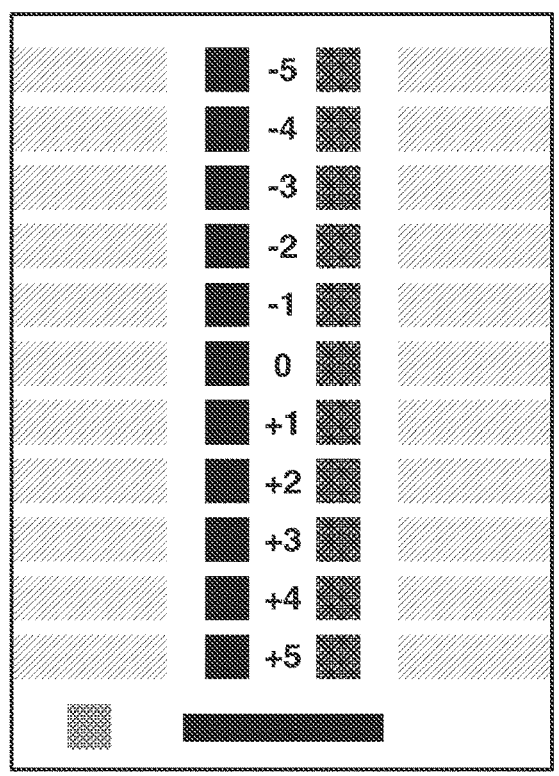
FIG. 5B is a diagram illustrating a read image obtained in the example of FIG. 5A.

FIG. 5B illustrates an image obtained by using the image reading unit 80 to read the test chart placed as illustrated in FIG. 5A. As for a document reading size, the size of the sheet on which the test chart is printed may be stored in the RAM 33, and an area of the same size may be read by the image reading unit 80. Alternatively, an area of fixed size greater than the size of the print sheet may be predetermined and read. In the present exemplary embodiment, the former case is illustrated.

In the state illustrated in FIG. 5B, the edges of the bar patterns 401 and 402 and the patch patches 403 and 403 can be successfully detected.

Figure 6A:
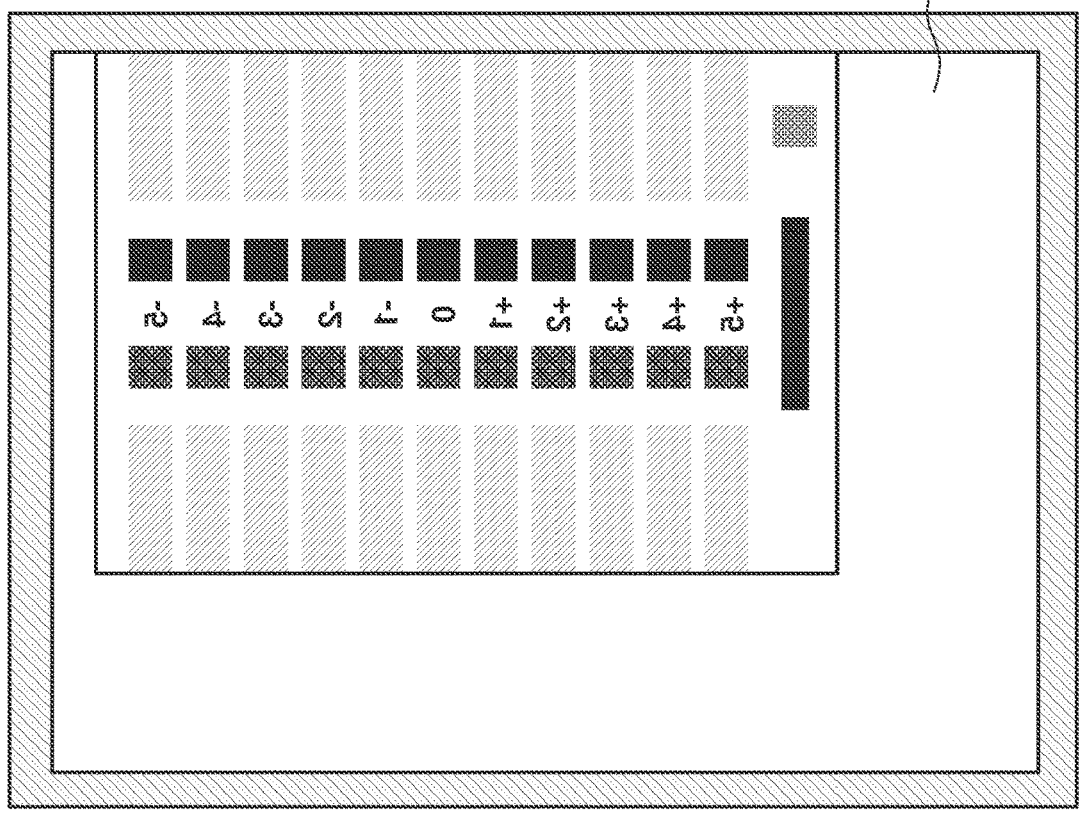
FIG. 6A is a diagram illustrating an example where the test chart is placed on the platen in the adjustment mode in a state where the test chart is shifted to a trailing edge side in a sub scanning direction.

FIG. 6A is a top view of the test chart that is obtained by forming the pattern image 400 on the recording material S and is placed on the platen reading window 312 with the print side down. In FIG. 6A, the test chart is not aligned to the top left abutting position and is shifted to the trailing edge side in the sub scanning direction in the reading by the image reading unit 80, compared to that in FIG. 5A. In FIG. 6A, a case where the user roughly places the test chart or is not aware that the test chart is to be aligned to the top left abutting position is assumed.

Figure 6B:
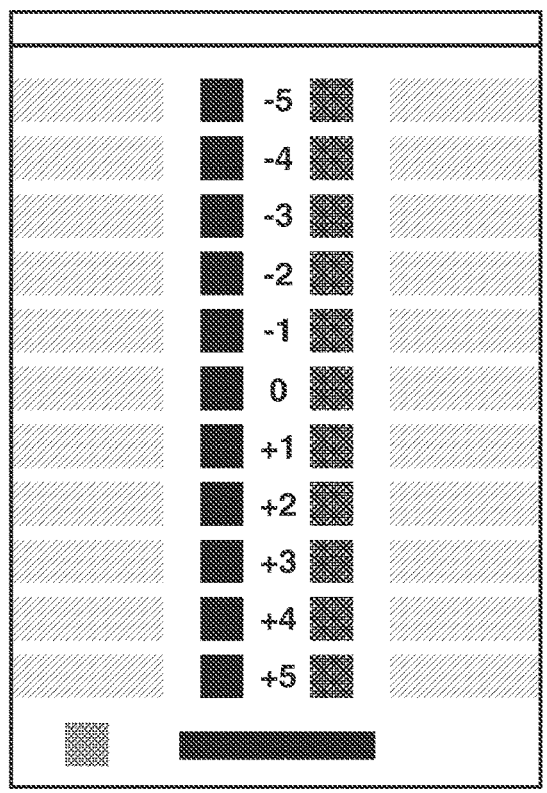
FIG. 6B is a diagram illustrating a read image obtained in the example of FIG. 6A.

FIG. 6B illustrates an image obtained by using the image reading unit 80 to read the test chart placed as illustrated in FIG. 6A. Since there is an unoccupied space on the leading edge side of the test chart in the sub scanning direction in the reading, a white plate (not illustrated) for pressing the document on the platen reading window 312 is to be read. As a result, an area where the white plate is read is added to the top of the read image.

In this state, the edges of the bar patterns 401 and 402 and the patch patches 403 and 404 can be successfully detected.

Figure 7A:
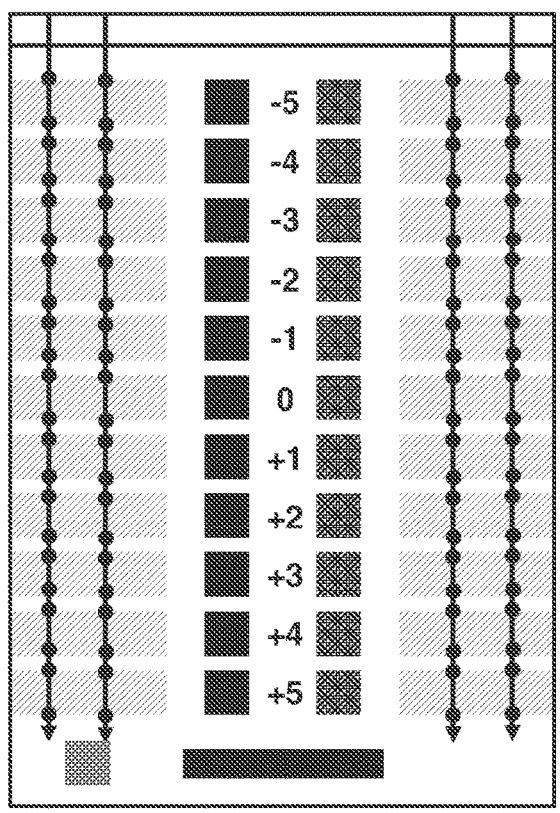
FIG. 7A is a diagram illustrating an example where detection of edges of adjustment patterns is performed in the image of FIG. 6B.

FIG. 7A illustrates an example where edge detection is performed in the read image of FIG. 6B to detect the positions of the bar patterns 401 and 402. The luminance values in the read image are checked from the top end toward the bottom end, and positions where a change in luminance value between adjacent pixels is a predetermined value or more are determined to be the edges of the bar patterns 401 and 402. Although not illustrated in FIG. 7A, the detection of the edges of the patch patterns 403 and 404 may be performed. The vertical center coordinates of the bars or the patches are determined from the edges detected by the vertical scanning. Similarly, edge detection is performed in the horizontal direction of the read image based on the luminance change between the adjacent pixels, starting from the respective vertical center coordinates. Based on the top, bottom, left, and right edges of the bars and the patches determined in this way, the positions of the bars and the patches are identified and positions for sampling luminance values for the adjustment are determined.

A luminance difference threshold for determining an edge is defined so that the lightest of the bars and patches in the bar patterns 401 and 402 and the patch patterns 403 and 404 can be detected. The luminance difference threshold for determining an edge is also defined so that the lightest bar or patch can be detected even if the pattern image 400 is formed on various sheets for use in the adjustment, using the secondary transfer voltage that is not necessarily optimum. In particular, to accurately obtain the angle of the read image, it is desirable that the bar patterns 401 and 402 located close to the left and right ends of the read image should be reliably detected. As a result, the threshold is determined to be less severe so that the condition can be relatively easily satisfied. At least one of red (R), green (G), and blue (B) luminance values of the pixels of the read image is employed for the condition. The condition may be defined using color representation methods other than RGB.

In the horizontal edge detection, the inclination of the test chart is to be considered. The inclination is thus calculated using the coordinates of the detected edges or the vertical center coordinates determined from the foregoing top and bottom edges of the patches or the bars.

To obtain the angle more accurately, it is desirable that the coordinates obtained from the bar patterns 401 and 402 separated as much as possible in the horizontal direction of the pattern image 400 should be used rather than the coordinates obtained from the patch patterns 403 and 404.

Figure 7B:
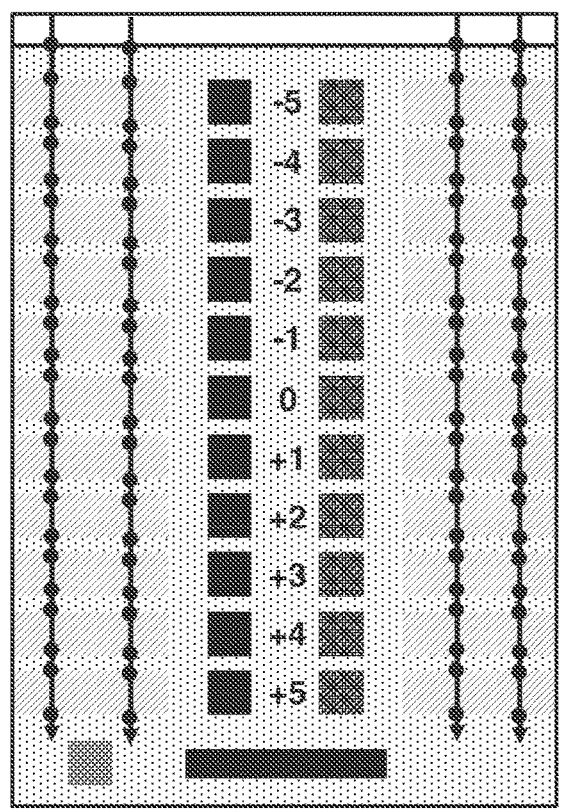
FIG. 7B is a diagram illustrating an example where the detection of the edges of the adjustment patterns is performed using a sheet of low whiteness level.

FIG. 7B illustrates an example where the edge detection for detecting the positions of the bar patterns 401 and 402 is performed in the read image obtained using a color sheet, similarly to the example of FIG. 7A. Since a color sheet is used, there is a luminance difference at the border between the top portion of the read image where the white plate is read and the test chart portion. If the less severe threshold is used as described above, the border can be erroneously determined as an edge. As a result, one more edge is detected in the vertical direction, which arises an issue of difficulty in determining the positions of the bar patterns 401 and 402.

Figure 8A:
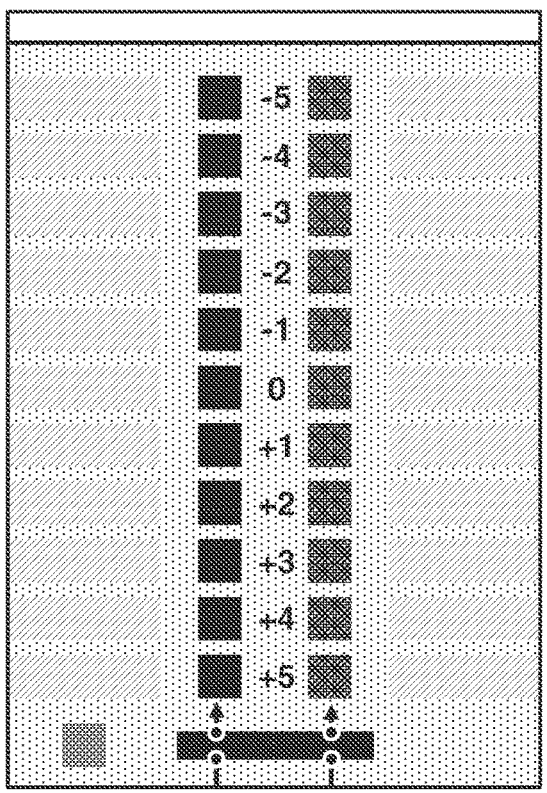
FIG. 8A is a diagram illustrating an example where detection of edges of a reference position determination black bar is performed according to the first exemplary embodiment.
Figure 8B:
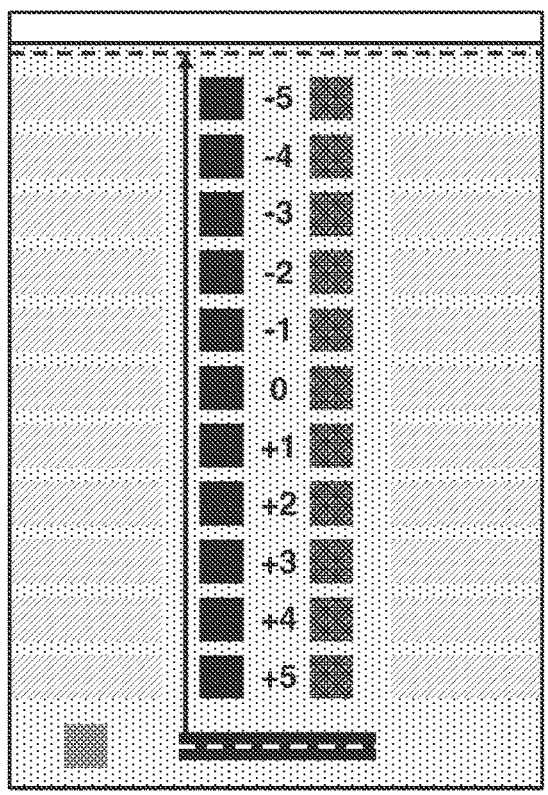
FIG. 8B is a diagram illustrating an example where a scan start position for the adjustment patterns is determined according to the first exemplary embodiment.
Figure 8C:
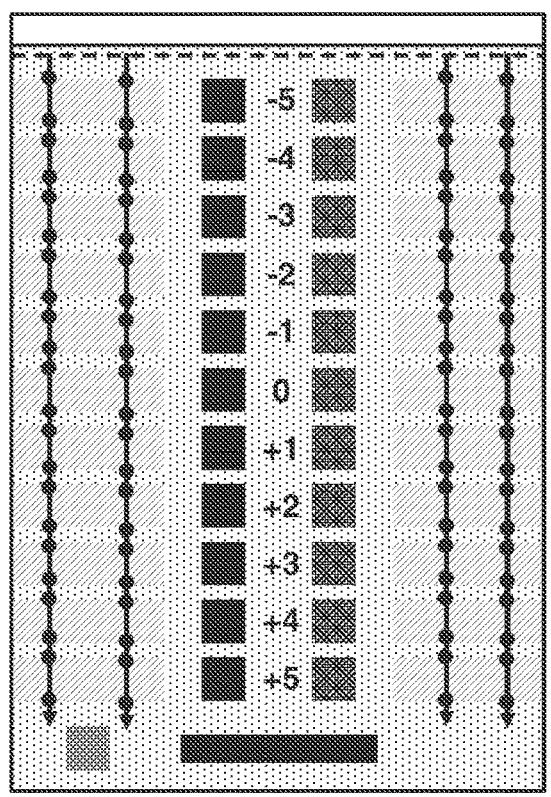
FIG. 8C is a diagram illustrating an example where the detection of the edges of the adjustment patterns is performed according to the first exemplary embodiment.

FIGS. 8A to 8C illustrate a method for addressing the issue by using a procedure according to the present exemplary embodiment. The procedure for detecting the edges of the bar patterns 401 and 402 and the edges of the patch patterns 403 and 404 includes three steps.

FIG. 8A illustrates the first step where detection of edges of the reference position determination black bar 406 is performed. The edge detection is performed from the bottom end toward the top end of the read image based on the luminance change between the adjacent pixels. If two edges are detected on each scan line, the scanning is ended. The vertical center coordinates of the reference position determination black bar 406 are determined based on the positions of the top and bottom edges detected on the respective scan lines. The inclination of the reference position determination black bar 406, i.e., the inclination of the entire read image is determined from the two points determined by the scanning along the two scan lines. If the inclination is greater than or equal to a predetermined value, it is determined that a portion other than the reference position determination black bar 406 is erroneously detected. In other words, in the present exemplary embodiment, the reference position determination black bar 406 also serves as an inclination detection image for detecting the inclination of the entire read image. If it is determined that the reference position determination black bar 406 is successfully detected, an area at a specific distance from the detected position of the reference position determination black bar 406 is scanned to detect the page identification patch 407. If the page identification patch 407 is successfully detected, the procedure proceeds to the next step. To detect the page identification patch 407, first, possible colors of the page identification patch 407 that are close to color information about the pixels included in the scanned area are classified and voted based on RGB conditions. It is then determined that the page identification patch 407 has the color for which the number of votes is greater than or equal to a specific value and is the greatest. Alternatively, the page identification patch 407 may be detected using other image analysis methods such as pattern matching.

As the luminance difference threshold for determining the edges of the reference position determination black bar 406 (the threshold related to the luminance difference), a condition at least severer than the threshold for determining the edges of the bar patterns 401 and 402 and the patch patterns 403 and 404 is set. More specifically, expected luminance values in the case of reading each of the following targets (1) to (4) using the image reading unit 80 are determined in advance:

(1) The white plate of the image reading unit 80;
(2) A most densely colored sheet allowable;
(3) The lightest of the bars and patches in the bar patterns 401 and 402 and the patch patterns 403 and 404 of the test chart; and
(4) The reference position determination black bar 406.

With the density of the reference position determination black bar 406 increased, the edge detection threshold can be defined so that the luminance difference between the targets (4) and (2) is detected as an edge but the luminance difference between the targets (2) and (1) is not detected as an edge. The reason why the present exemplary embodiment is to be implemented is that it is difficult to define the threshold for determining the edges of the bar patterns 401 and 402 and the patch patterns 403 and 404 so that the luminance difference between the targets (3) and (2) is detected as an edge but the luminance difference between the targets (2) and (1) is not detected as an edge.

FIG. 8B illustrates the second step where a vertical position (a scan start position) for starting the detection of the edges of the bar patterns 401 and 402 and the patch patterns 403 and 404 is determined. A vertical coordinate shifted upward by a certain number of pixels from the vertical center coordinate of the reference position determination black bar 406 determined in the first step is determined so as to be within the area of the test chart (hereinafter referred to as the chart area). More specifically, the size of the recording material S on which the test chart is printed is stored in advance in the RAM 33, and the top end of the chart area can be determined by subtracting the distance from the bottom end of the pattern image 400 to the center of the reference position determination black bar 406 from the sub scanning length of the recording material S. If the edge detection is started at the top end of the chart area, there is a possibility that the border between the portion where the white plate is read and the portion where the test chart is read may be scanned due to an error. Thus, in one embodiment, the scan start position is set to an area inside the test chart with a fixed amount of offset.

FIG. 8C illustrates the third step where the detection of the edges of the bar patterns 401 and 402 and the patch patterns 403 and 404 is performed. The edge detection is performed from the scan start position determined in the second step toward the bottom end, based on the luminance difference between the adjacent pixels. Since the scanning is started within the chart area of the read image, the edges of the bar patterns 401 and 402 and the patch patterns 403 and 404 can be detected without erroneously detecting the border between the portion where the white plate is read and the portion where the test chart is read.

Figure 9A:
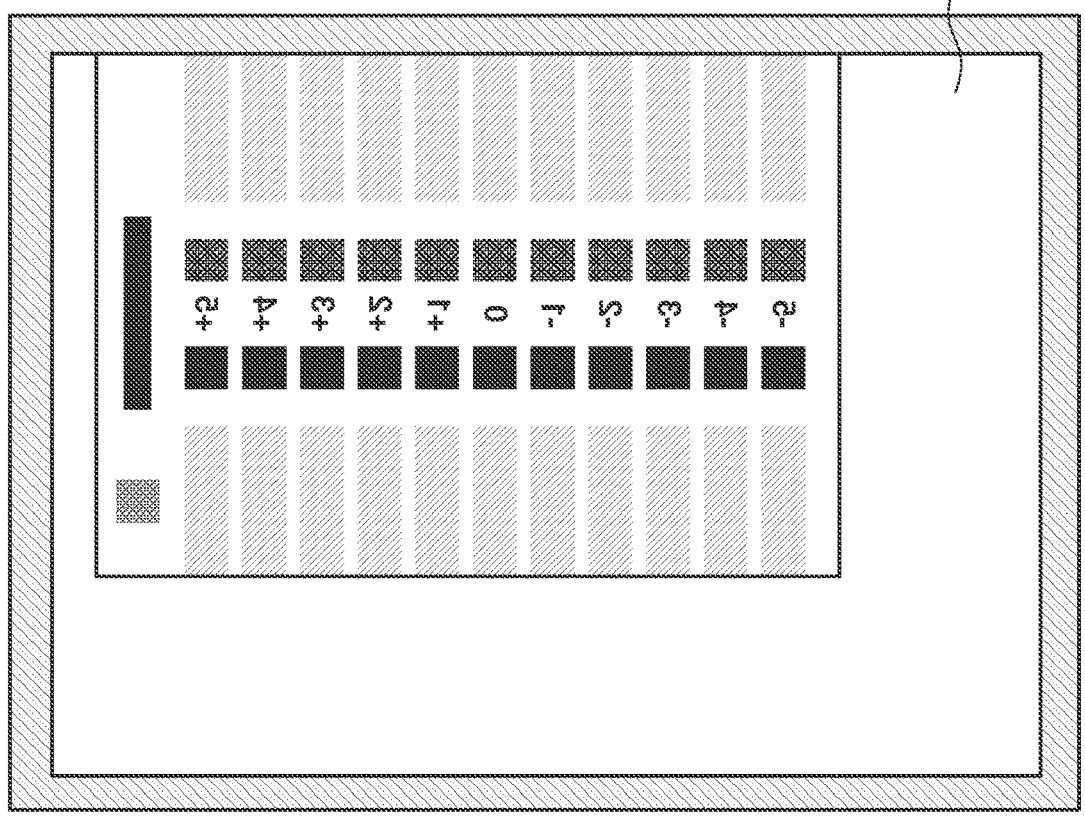
FIG. 9A is a diagram illustrating an example where the test chart is placed on the platen in the adjustment mode in a state where the test chart is shifted in the sub scanning direction and is reversed by 180°.

FIG. 9A is a top view of the test chart that is obtained by forming the pattern image 400 on the recording material S and is rotated 180° from the orientation in FIG. 6A and placed on the platen reading window 312. To save the user from having to consider the orientation in which the test chart is placed, it is desirable in terms of usability that the adjustment should be made appropriately even in the case of FIG. 9A. An operation according to the present exemplary embodiment in a case where the test chart is placed in such an orientation will be described.

Figure 9B:
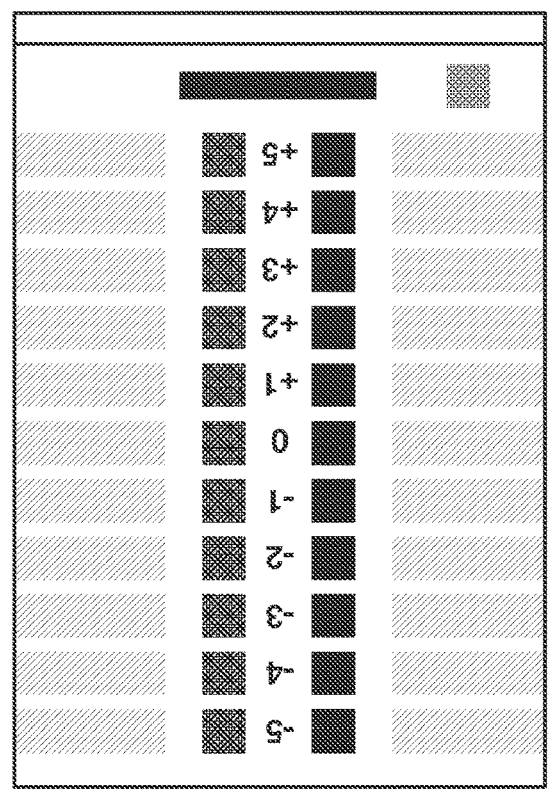
FIG. 9B is a diagram illustrating a read image obtained in the example of FIG. 9A.

FIG. 9B illustrates an image obtained by using the image reading unit 80 to read the test chart placed as illustrated in FIG. 9A. The chart area of the read image is rotated 180° from the orientation in FIG. 6B, and the area where the white plate is read is added to the top of the read image.

Figure 10A:
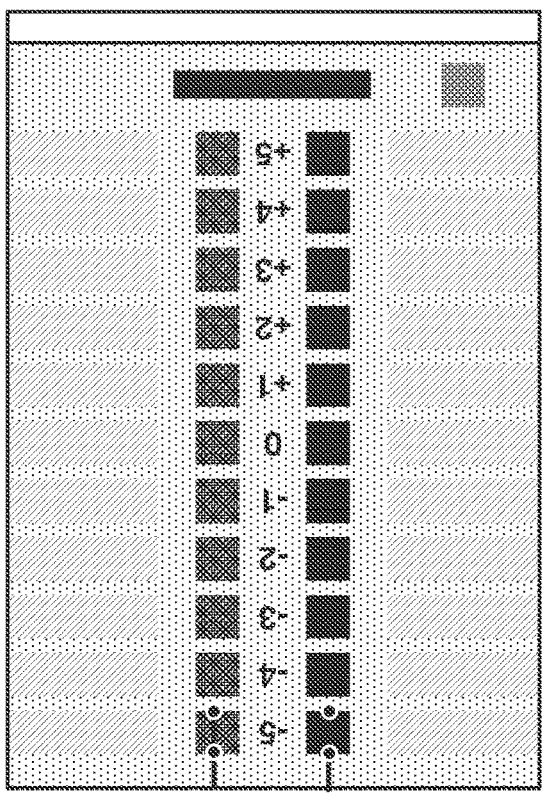
FIG. 10A is a diagram illustrating an example where the detection of the edges of the reference position determination black bar in the image of FIG. 9B fails in the first exemplary embodiment.
Figure 10B:
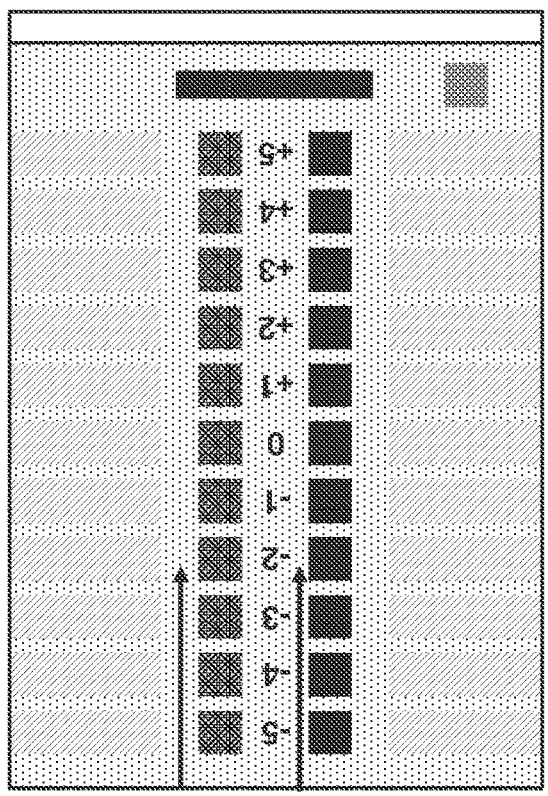
FIG. 10B is a diagram illustrating another example where the detection of the edges of the reference position determination black bar in the image of FIG. 9B fails in the first exemplary embodiment.
Figure 10C:
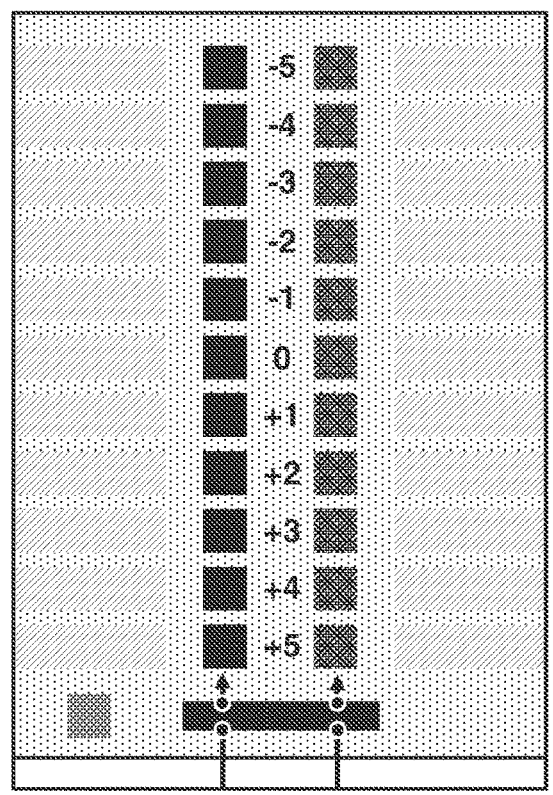
FIG. 10C is a diagram illustrating an example where the image of FIG. 9B is rotated 180° and then the detection of the edge of the reference position determination black bar is performed according to the first exemplary embodiment.

FIGS. 10A to 10C illustrate an operation performed for the image of FIG. 9B according to the present exemplary embodiment.

FIG. 10A illustrates a case where the patch patterns 403 and 404 are erroneously detected as the reference position determination black bar 406 during the detection of the edges of the reference position determination black bar 406. In this case, the position of the reference position determination black bar 406 is erroneously detected. If the detection of the page identification patch 407 is attempted based on this position as described above, the detection fails because the page identification patch 407 is not present in the scanned area. In this case, the test chart is determined to be placed in the 180° reverse orientation. The entire read image is then rotated 180°, and the detection of the edges of the reference position determination black bar 406 is attempted again.

FIG. 10B illustrates a case where no edge is successfully detected during the detection of the edges of the reference position determination black bar 406. This case occurs when the test chart is placed on the platen glass 82 with an offset in the main scanning position because the horizontal positions of the two lines for scanning the reference position determination black bar 406 are fixed. If an attempt is made to detect the edges of the reference position determination black bar 406 over a certain number of pixels, but two edges are not successfully detected on each scan line, the test chart is determined to be placed in the 180° reverse orientation. The entire read image is then rotated 180°, and an attempt is made again to detect the edges of the reference position determination black bar 406.

FIG. 10C illustrates a case where the detection of the reference position determination black bar 406 has failed as described above and an attempt is made again to detect the edges of the reference position determination black bar 406 after the read image is rotated 180°. As for the detection of the edges of the reference position determination black bar 406, a severe threshold is set to prevent the border between the area where the white plate is read and the chart area from being erroneously determined as an edge as described above even if the scanning is started from the bottom end area of the read image where the white plate is read. This makes it possible to appropriately perform the detection of the edges of the reference position determination black bar 406.

Figure 11:
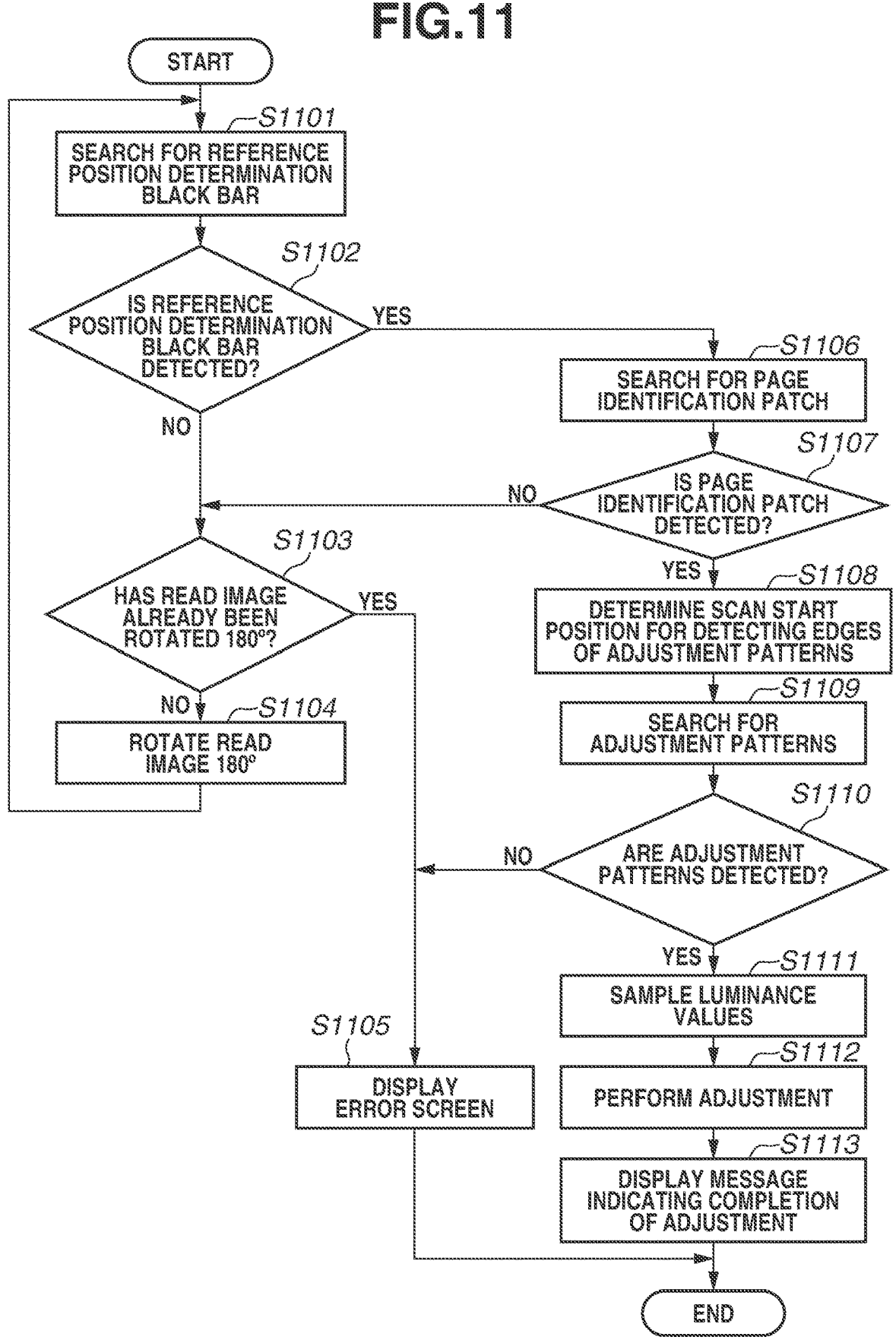
FIG. 11 is a flowchart illustrating adjustment processing according to the first exemplary embodiment.

FIG. 11 is a flowchart illustrating adjustment processing in which the control unit 30 reads the test chart for the secondary transfer voltage according to the present exemplary embodiment. A program, which is related to the flowchart and is to be executed by the CPU 31, is stored in the ROM 32 and loaded into the RAM 33.

The flowchart is started in a state where the test chart formed on the recording material S is read by the image reading unit 80 and the image obtained by the reading is stored in the RAM 33. Steps in the flowchart are executed by the CPU 31.

In step S1101, the CPU 31 scans the read image from the bottom end toward the top end as illustrated in FIG. 8A. If there is a point where the luminance difference between the adjacent pixels is greater than or equal to a predetermined value, the CPU 31 determines that the point is an edge of the reference position determination black bar 406. If the page identification patch 407 is unable to be detected based on the edge detection or if a specific distance has been scanned without detecting two edges, the CPU 31 ends the scanning. The scanning is performed on two scan lines. The processing proceeds to step S1102.

In step S1102, if two edges are successfully detected on each of the two scan lines in step S1101 and the inclination of the reference position determination black bar 406 is less than or equal to the predetermined value as describe above, the CPU 31 determines that the reference position determination black bar 406 is successfully detected (YES in step S1102), and the processing proceeds to step S1106. If the reference position determination black bar 406 is not successfully detected (NO in step S1102), the processing proceeds to step S1103.

In step S1103, the CPU 31 determines whether the read image has already been rotated 180°. If the read image has not been rotated 180° (NO in step S1103), the processing proceeds to step S1104. If the read image has already been rotated 180° (YES in step S1103), the processing proceeds to step S1105.

In step S1104, the read image is rotated 180°. The 180°-rotation processing may be performed by the CPU 31 or a not-illustrated image processing application-specific integrated circuit (ASIC). Alternatively, a flag may be set to perform the subsequent scanning in a vertically opposite direction without actually rotating the read image. The processing proceeds to step S1101.

In step S1105, the CPU 31 displays, on the display unit 70a, an error screen indicating that the read image is not suitable for the adjustment. The error screen provides a display for prompting the user to check whether the test chart is placed on the image reading unit 80 and whether the test chart is in the proper orientation. The error screen may transition to a screen where the user gives a document reading instruction. The processing ends without updating the adjustment value.

In step S1106, the CPU 31 performs the detection of the position of the page identification patch 407 based on the detected position of the reference position determination black bar 406 as described above. The CPU 31 determines which color of the page identification patch 407 the colors of the pixels in the specific area are close to.

In step S1107, the CPU 31 determines whether the page identification patch 407 is successfully detected. If the page identification patch 407 is successfully detected (YES in step S1107), the processing proceeds to step S1108. If the page identification patch 407 is not successfully detected (NO in step S1107), the processing proceeds to step S1103.

In step S1108, the CPU 31 determines the scan start position for detecting the edges of the adjustment patterns (the bar patterns 401 and 402 and the patch patterns 403 and 404) based on the position of the reference position determination black bar 406 as illustrated in FIG. 8B. The processing proceeds to step S1109.

In step S1109, the CPU 31 performs the detection of the edges of the bar patterns 401 and 402 and the patch patterns 403 and 404 from the position determined in step S1108 toward the bottom of the read image as illustrated in FIG. 8C.

The number and positions of scan lines are determined so that at least one scan line passes through each of the bar patterns 401 and 402. The number of scan lines is to be increased if possible, so that the adjustment can be made using the edge detection results on other lines if the edge detection on one line fails due to an unexpected image defect. The read image is then horizontally scanned for edge detection as described above. A description thereof will thus be omitted. The processing proceeds to step S1110.

In step S1110, the CPU 31 determines whether the bar patterns 401 and 402 and the patch patterns 403 and 404 are successfully detected. Whether the bar patterns 401 and 402 and the patch patterns 403 and 404 are successfully detected is determined based on the following two determinations. First, the CPU 31 determines whether all edges to be detected on two scan lines separated by a predetermined distance or more are successfully detected by the vertical scanning for edge detection in step S1109. Secondly, the CPU 31 determines whether all edges to be detected from all the bar patterns 401 and 402 and the patch patterns 403 and 404 by the subsequent horizontal scanning for edge detection are successfully detected. If all the edges are successfully detected in both of the above two cases, the CPU 31 determines that the adjustment patterns are successfully detected (YES in step S1110), and the processing proceeds to step S1111. If the number of successfully detected edges is insufficient (NO in step S1110), the processing proceeds to step S1105. If an expected number of edges are successfully detected but the edges are not detected at equal intervals, the CPU 31 may determine that an error occurs and the processing may proceed to step S1105.

In step S1111, the CPU 31 identifies the positions of the bar patterns 401 and 402 and the patch patterns 403 and 404 from the vertical and horizontal positions of the detected edges, and obtains (samples) luminance values in specific areas, such as areas near centers, within the bar patterns 401 and 402 and the patch patterns 403 and 404. The processing proceeds to step S1112.

In step S1112, the CPU 31 calculates the adjustment value for the secondary transfer voltage by using the luminance values obtained in step S1111, and updates the adjustment value stored in the RAM 33 and the HDD 35. Since the processing for calculating the adjustment value is known, a description thereof will be omitted. The processing proceeds to step S1113.

In step S1113, the CPU 31 displays, on the display unit 70a, a message indicating that the adjustment is successfully completed, and the processing ends. Alternatively, the adjustment value calculated in step S1112 may be displayed on the display unit 70a so that the user can check the adjustment value and make fine adjustments thereto.

With the above-described procedure, the secondary transfer voltage can be adjusted by appropriately detecting the adjustment patterns and sampling luminance values even if a color sheet is used and the detection threshold for the adjustment patterns is set to be less severe. While the present exemplary embodiment has been described to be applied to the adjustment of the secondary transfer voltage, the present exemplary embodiment can be similarly applied to other adjustment functions that print and read a chart for which various types of sheets are assumed to be used.

In the present exemplary embodiment, the image reading unit 80 is described to read the test chart placed on the platen glass 82. However, the image reading unit 80 may be configured to read the test chart output by using an inline sensor.

In the present exemplary embodiment, the configuration has been described in which, when the edges of the patch patterns 403 and 404 are to be detected, control is performed based on the detection result of the bar patterns 401 and 402 so that the scanning of the read image is started within the boundary of the recording material S and outside the patch patterns 403 and 404. However, the present exemplary embodiment is not limited thereto.

For example, a reading result obtained by scanning the read image from the outside of the boundary of the recording material S may be stored, and a detection result on the outside of the boundary of the recording material S in the obtained reading result may be excluded based on the bar patterns 401 and 402.

According to the present exemplary embodiment, erroneous detection of the test image for adjusting the secondary transfer voltage can be prevented.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-082282, filed May 14, 2021, which is hereby incorporated by reference herein in its entirety.

What is claimed is:

1. An image forming apparatus comprising:
    an image forming portion configured to form a toner image;
    a transfer unit configured to transfer the formed toner image to a recording material;
    a power supply configured to apply a voltage to the transfer unit;
    a reader configured to read an image on the recording material; and
    a control unit configured to execute a mode,
    wherein, in executing the mode, the control unit performs an output operation to output a test chart formed by transferring a plurality of test images to the recording material while applying a plurality of test voltages from the power supply to the transfer unit and then sets, based on a result of the reader reading the plurality of test images, a transfer voltage to be applied to the transfer unit during transfer,
    wherein, in outputting the test chart, the control unit controls the image forming portion to form a reference image on the test chart, and
    wherein the control unit is configured to determine a scanning start position when the plurality of test images is scanned based on a detection result when the reader detects the reference image, and the control unit is configured to set the scanning start position in a frame of the recording material where the test chart is formed, and the control unit is configured to detect the reference image based on a first threshold and detect the plurality of test images based on a second threshold smaller than the first threshold.

2. The image forming apparatus according to claim 1, wherein the control unit sets the transfer voltage based on a scanning result when scanning the plurality of test images is started from the scanning start position.

3. The image forming apparatus according to claim 1, wherein the control unit obtains position information about edges of the plurality of test images based on a scanning result when scanning the plurality of test images is started from the scanning start position, and determines a reading position for obtaining density information about the plurality of test images based on the obtained position information.

4. The image forming apparatus according to claim 1, wherein the plurality of test images includes at least a halftone image, and the reference image is higher in density than the halftone image.

5. The image forming apparatus according to claim 1, wherein the reference image also serves as an inclination detection image for detecting an inclination of the plurality of test images.

6. The image forming apparatus according to claim 1, wherein the reference image is a solid black image.

7. The image forming apparatus according to claim 1, wherein the reader includes a reading unit configured to read the image and a conveyance unit configured to convey the recording material to the reading unit.

8. The image forming apparatus according to claim 1, further comprising a platen on which the recording material with the test chart formed thereon is to be placed,
    wherein the reader is configured to read the plurality of test images on the recording material placed on the platen.

9. The image forming apparatus according to claim 8,
    wherein, in executing the mode, the reader reads the test chart in each of a first case where the test chart, placed on the platen by an operator, is oriented in a first direction and a second case where the test chart, placed on the platen by the operator, is oriented in a second direction opposite to the first direction, and
    wherein, in executing the mode, the control unit sets the transfer voltage based on the result of the reader reading the test chart regardless of whether the test chart placed on the platen is oriented in the first direction or the second direction.

10. The image forming apparatus according to claim 9, wherein the reference image also serves as an image for identifying an orientation of the test chart.

11. The image forming apparatus according to claim 9, wherein, in outputting the test chart, the control unit controls the image forming portion to form, on the test chart, an identification image for identifying a page of the test chart, and determines the scanning start position based on the reference image and the identification image.

12. The image forming apparatus according to claim 9, wherein, in a case where the reference image is determined to be not read by the reader in a predetermined direction, the control unit controls the reader to read the test chart in a direction opposite to the predetermined direction.

* * * * *